(12) United States Patent
Reich et al.

(10) Patent No.: US 8,417,275 B2
(45) Date of Patent: *Apr. 9, 2013

(54) SYSTEM AND METHOD FOR MULTIPLE SIMULTANEOUS COMMUNICATION GROUPS IN A WIRELESS SYSTEM

(75) Inventors: Jason A. Reich, San Diego, CA (US); Douglas M. Crockett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,148

(22) Filed: Jul. 5, 2012

(65) Prior Publication Data

US 2012/0276941 A1    Nov. 1, 2012

Related U.S. Application Data

(63) Continuation of application No. 11/357,267, filed on Feb. 17, 2006, now Pat. No. 8,224,366.

(51) Int. Cl.
*H04B 7/00* (2006.01)

(52) U.S. Cl.
USPC ........... 455/517; 455/518; 455/519; 455/520; 709/204; 709/205; 709/206; 709/207

(58) Field of Classification Search .......... 455/417–420; 709/204–207
See application file for complete search history.

(56) References Cited

U.S. PATENT DOCUMENTS

| | | | |
|---|---|---|---|
| 5,809,018 A | 9/1998 | Lehmusto | |
| 7,587,487 B1 * | 9/2009 | Gunturu | 709/224 |
| 7,953,821 B2 * | 5/2011 | Ono et al. | 709/219 |
| 8,224,366 B2 | 7/2012 | Reich et al. | |
| 2003/0153341 A1 | 8/2003 | Crockett et al. | |
| 2005/0198162 A1 * | 9/2005 | Bauer et al. | 709/206 |
| 2006/0229094 A1 | 10/2006 | Huh et al. | |
| 2007/0016828 A1 | 1/2007 | Luo et al. | |

FOREIGN PATENT DOCUMENTS

| | | |
|---|---|---|
| CN | 1120380 A | 4/1996 |
| JP | 8508373 | 9/1996 |
| JP | 2004535097 T | 11/2004 |
| KR | 20000072370 | 12/2000 |
| KR | 20020081390 | 10/2002 |
| KR | 20030047874 | 6/2003 |
| KR | 20050057501 | 6/2005 |

(Continued)

OTHER PUBLICATIONS

International Preliminary Report on Patentability—PCT/US07/062045, The International Bureau of WIPO—Geneva, Switzerland, Aug. 19, 2008.

(Continued)

*Primary Examiner* — Fayyaz Alam
(74) *Attorney, Agent, or Firm* — Raphael Freiwirth

(57) ABSTRACT

A system and method enable a wireless device to support simultaneously multiple push-to-talk (PTT) communications and interrupt certain PTT communication with higher priority ones. A user subscribes to multiple PTT communication groups and designates one of the groups as the primary group. The wireless device receives and plays PTT communications from the multiple PTT communication groups and interrupts playing of a PTT communication from a non-primary group if a PTT communication is received from the primary PTT communication group.

50 Claims, 7 Drawing Sheets

FOREIGN PATENT DOCUMENTS

| | | |
|---|---|---|
| RU | 2258321 C2 | 8/2005 |
| TW | 200404420 | 3/2004 |
| WO | WO9423525 A1 | 10/1994 |
| WO | WO0047005 | 8/2000 |
| WO | WO0167675 | 9/2001 |
| WO | WO02085051 A1 | 10/2002 |
| WO | WO2005036802 A2 | 4/2005 |
| WO | WO2005101697 A1 | 10/2005 |
| WO | WO2006002217 A1 | 1/2006 |
| WO | WO2006002266 A1 | 1/2006 |

OTHER PUBLICATIONS

International Search Report—PCT/US07/062045, International Searching Authority—European Patent Office, Jun. 25, 2007.

"Push to talk over Cellular (PoC) Architecture", V2.0, Open Mobile Alliance, Feb. 14, 2006, XP002437218.

Taiwan Search Report—TW096105922—TIPO—May 3, 2011.

Taiwan Search Report—TW096105922—TIP0—Aug. 30, 2011.

Translation of Office Action in Rusian application 2008137126 corresponding to U.S. Appl. No. 11/357,267, citing WO9423525, WO2005101697, RU2258321, WO2006002266 and WO2006002217 dated Mar. 4, 2011.

Written Opinion—PCT/US07/062045, International Searching Authority—European Patent Office, Jun. 25, 2007.

\* cited by examiner

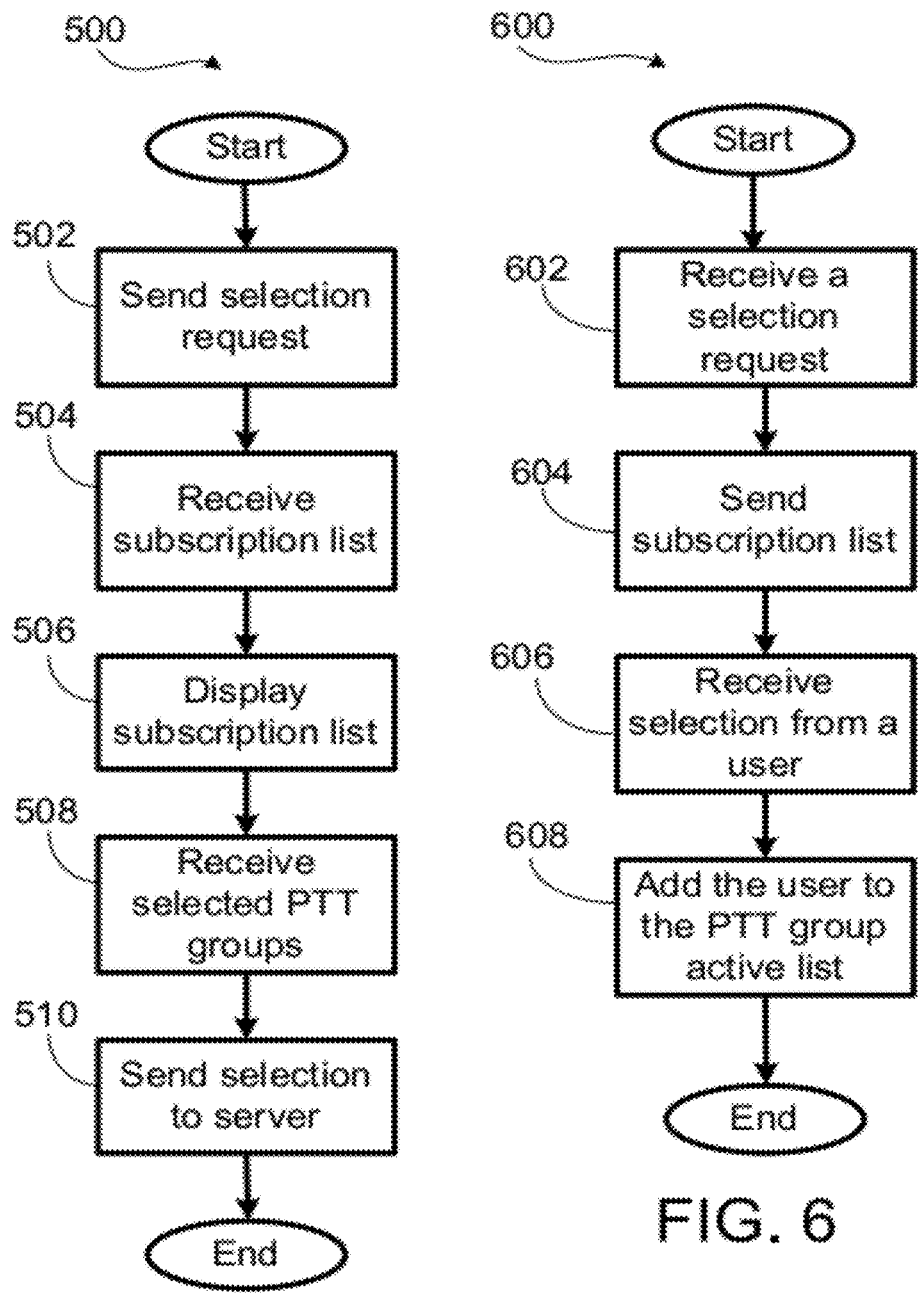

SYSTEM AND METHOD FOR MULTIPLE SIMULTANEOUS COMMUNICATION GROUPS IN A WIRELESS SYSTEM

CLAIM OF PRIORITY UNDER 35 U.S.C. §120

The present application for patent is a continuation of patent application Ser. No. 11/357,267 entitled "SYSTEM AND METHOD FOR MULTIPLE SIMULTANEOUS COMMUNICATION GROUPS IN A WIRELESS SYSTEM" filed Feb. 17, 2006, pending, and assigned to the assignee hereof and hereby expressly incorporated by reference herein.

BACKGROUND OF THE INVENTION

1. Field of the Invention

The present invention generally relates to wireless telecommunications, and more specifically, relates to a system and method for supporting multiple simultaneous group communications among communicating devices on a wireless network.

2. Description of the Related Art

Technology advancement has made mobile telephones or wireless communications devices inexpensive and accordingly ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a handset, uses one single frequency for both upward and downward communications with a remote server, while in a normal wireless communication a wireless telephone uses two frequencies for communicating with the server, one for outgoing and one for incoming communications. The PTT system requires the person who is speaking to press a button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server duplicates the message for each and every receiving party. After the message is transmitted to every receiving party, the channel is released and ready for use by other parties.

In one type of PTT system an existing cellular technology connects the recipient devices of a PTT group. Conversely a normal "walkie-talkie" style two-way radio will only operate if the radios are within a certain distance of each other such that line-of-sign remote communication is possible. Cellular telecommunication systems using the PTT feature can communicate anywhere within a service area specified by its service provider, which is typically a large urban area, or even nationally.

Generally, in a communication through the PTT feature on existing systems, one wireless device is part of one PTT communication group and a user at one wireless device cannot communicate simultaneously with multiple PTT communication groups. Additionally, while an incoming PTT message is playing at the wireless device, the user cannot interrupt the current speaker. It is thus to such a system and method to enable a wireless device to simultaneously monitor multiple PTT communication groups the present invention is primarily directed.

SUMMARY OF THE INVENTION

The system and method according to the invention enables a wireless device to simultaneously monitor multiple PTT communication groups and to interrupt an incoming PTT communication with a higher priority PTT communication. The system and method also enable a server to support multiple PTT communication groups, where one or more PTT communication groups are designated as primary PTT communication groups or at least a priority ranking for communications of each group is instituted.

In one embodiment, a method enables a wireless device having an audio device and a display device to monitor multiple PTT communications on a wireless network. The method includes the steps of subscribing to multiple PTT communication groups, selecting at least a primary PTT communication group, receiving and playing at least one PTT communication from a PTT server, wherein the at least one PTT communications is from either the primary PTT communication group or a non-primary PTT communication group, and if a PTT communication from a non-primary PTT communication group is playing on the audio device and a PTT communication from the primary PTT communication group is received, interrupting the PTT communication from the non-primary PTT communication group and playing the received PTT communication from the primary PTT communication group on the audio device.

In another embodiment, a method for a PTT communication server to provide multiple PTT communications to user devices. The method includes the steps of receiving a subscription to multiple PTT communication groups, receiving a selection of a primary PTT communication group, receiving at least one PTT communication from a first user device, wherein the at least one PTT communications is either a primary PTT communication or a non-primary PTT communication to a designated PTT group, and if a non-primary PTT communication is being transmitted to a second user device of the designated PTT group and a primary PTT communication is received, interrupting the transmission of the non-primary PTT communication and transmitting the received primary PTT communication to the second user device.

In another embodiment, an apparatus monitors multiple PTT communications on a wireless telecommunication network. The apparatus includes a transceiver for transmitting and receiving PTT communications from a remote server, a storage unit for storing information on multiple PTT communication groups, a display unit for displaying activity announcements regarding PTT communications, a user interface unit for playing PTT communications received, a PTT interface for receiving a PTT request from the user, and a controller for determining which PTT communications to play by the user interface unit.

In another embodiment, a system allows multiple PTT communications among wireless devices in a wireless communications network. The system includes a server in communication with the wireless communication network, the server selectively maintaining multiple PTT communications with a user device through multiple channels, and a user device capable of communicating with the server through the wireless communications network, the user device simultaneously receiving PTT communications from a plurality of PTT communication groups, wherein the user device interrupts playing of a PTT communication if a primary PTT communication is received from the server.

The present system and methods are therefore advantageous as they enable a wireless communication device to simultaneously monitor multiple PTT communication groups and also allow the wireless communication device to interrupt an incoming PTT message to transmit a higher priority PTT message to other members of a same PTT communication group. The system is particularly advantageous where a priority of message communication is necessary, such as a command hierarchy in military or emergency personnel.

Other advantages and features of the present invention will become apparent after review of the hereinafter set forth Brief Description of the Drawings, Detailed Description of the Invention, and the Claims.

BRIEF DESCRIPTION OF THE DRAWINGS

FIG. 5 is a flow chart for an exemplary embodiment of a user subscription process.

FIG. 6 is a flow chart for an exemplary embodiment of a server subscription process.

DETAILED DESCRIPTION OF THE INVENTION

In this description, the terms "communication device," "wireless device," "wireless communications device," "PTT communication device," "handheld device," and "handset" are used interchangeably, and the terms "channels" and "groups" are used interchangeably. The term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

In overview, the system and method enables a wireless device to simultaneously monitor multiple PTT communication groups. The system and method also enables one or more servers or communication enabling devices to support multiple PTT communication groups, where one or more PTT communication groups are designated as primary PTT communication groups or otherwise given a priority over other PTT communications.

Figure 1:
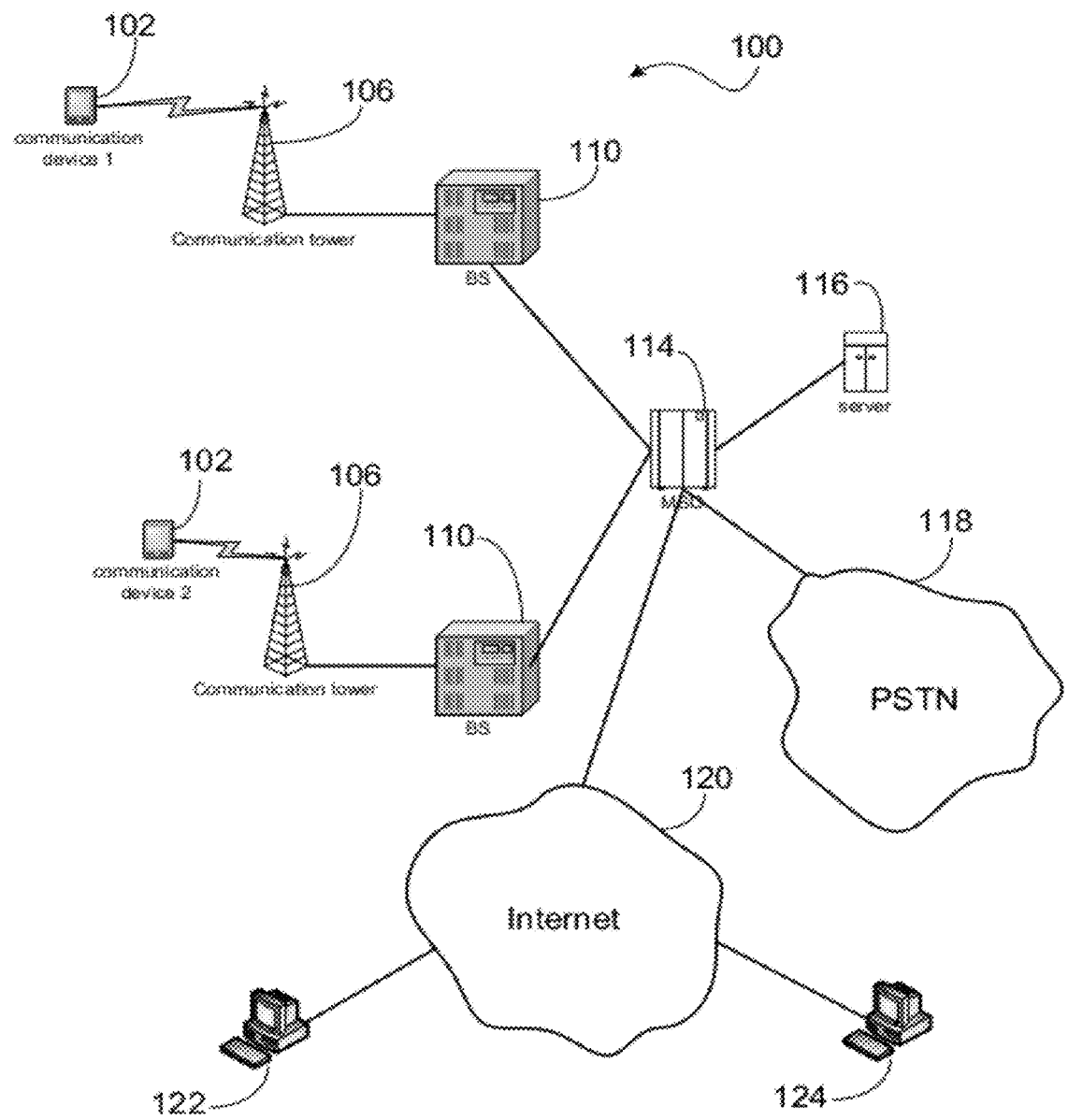
FIG. 1 depicts one exemplary embodiment of a communication network used according to the present invention.

FIG. 1 depicts a communication network 100 used according to the present invention. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that support push-to-talk (PTT) communications. The commands and data input by each user are transmitted as digital data to a communication tower 106. The communication between a user using a communication device 102 and the communication tower 106 can be based on different technologies, such code division multiple access (CDMA), time division multiple access (TDMA), frequency division multiple access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. Optionally, the server 116 may be part of the MSC 114. During a PTT communication, a wireless communication device 102 sends and receives audio data on an assigned communication channel and control data are sent and received through a data channel. The server may also suppress transmission of PTT communication to a particular wireless device upon request from that device.

In one embodiment, the server 116 includes an application that supports the PTT feature and is capable of supporting multiple PTT communication groups for each communication device 102, where one of the PTT communication group is designated as the primary PTT communication group. Communications from a primary PTT communication group may trump communications from non-primary PTT communication groups within the devices of the group. Use of a primary PTT communication group may also be restricted to a limited group of users. All members of a PTT primary communication group can monitor the communications of the group, but, typically, only few will be able to transmit communications to all members.

Figure 2:
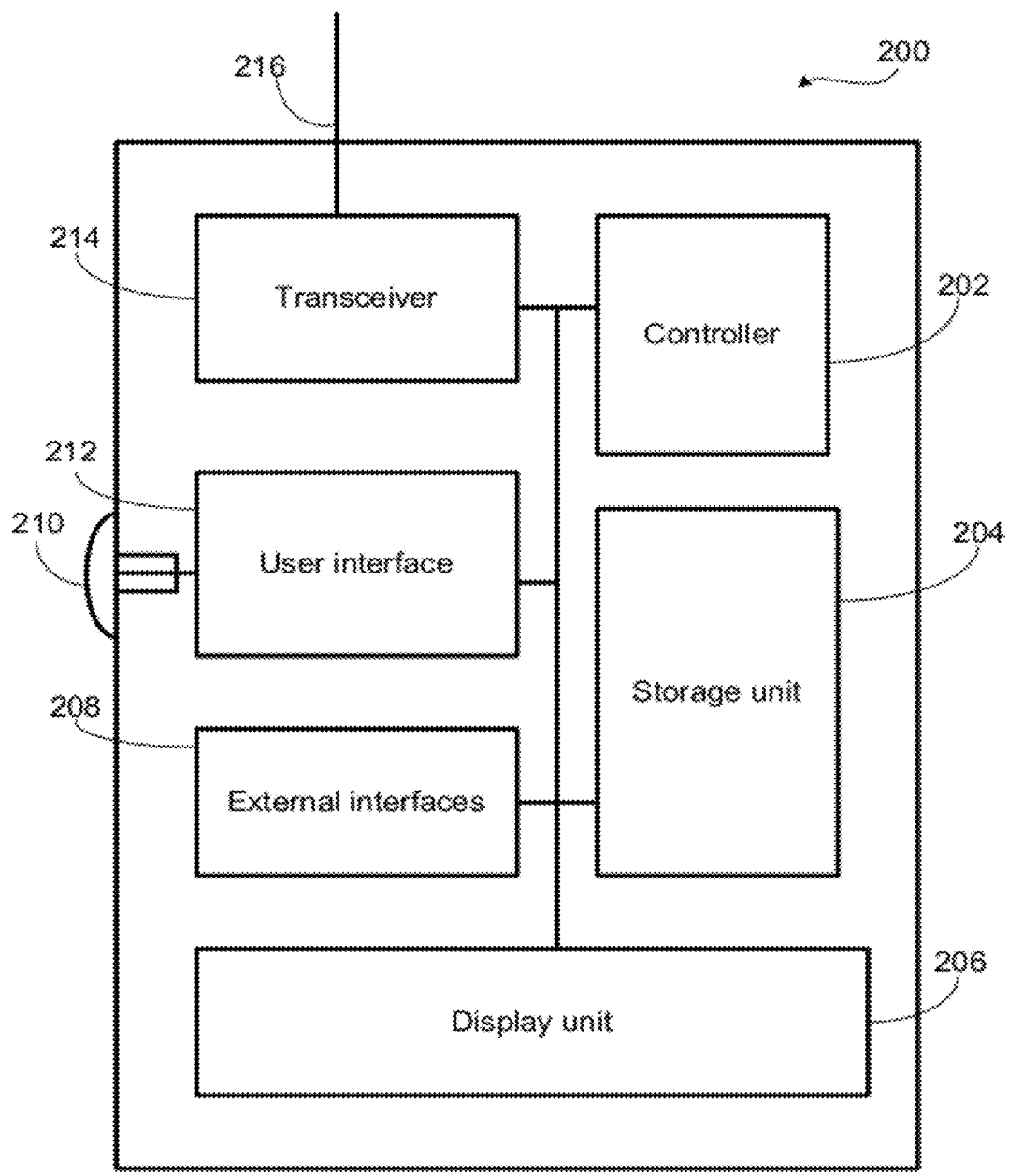
FIG. 2 illustrates a block diagram of a wireless device in one exemplary embodiment.

FIG. 2 illustrates a block diagram 200 of a wireless handset 102. The wireless handset 102 includes a controller 202, a storage unit 204, a display unit 206, an external interface unit 208, a user interface unit 212, a push-to-talk activation unit 210, a transceiver 214, and an antenna 216. The controller 202 can be hardware, software, or a combination thereof. The controller 202 is capable of sending a request to transmit a primary PTT communication message to the server 116 when the wireless handset 102 is playing an incoming PTT communication message. The display unit 206 may display graphical images or information about an incoming PTT communication to the user. The external interface unit 208 controls hardware, such as speaker, microphone, and display unit, used for communication with the user. The user interface unit 212 controls hardware, such as keypad and push-to-talk activation unit 210. The transceiver 214 transmits and receives radio signals to and from the communication tower 106. The controller 202 interprets commands and data received from the user and the communication network 100. An audio communication received from a member of the primary PTT communication group may interrupt a non-primary audio communication that is playing on the speaker of the device. The wireless handset 102 is capable of monitoring multiple PTT communication groups and may also request communications from a particular PTT communications group be muted, or volume significantly lessened such that the non-primary communication can still be heard faintly in the background of the primary communication.

Figure 3:
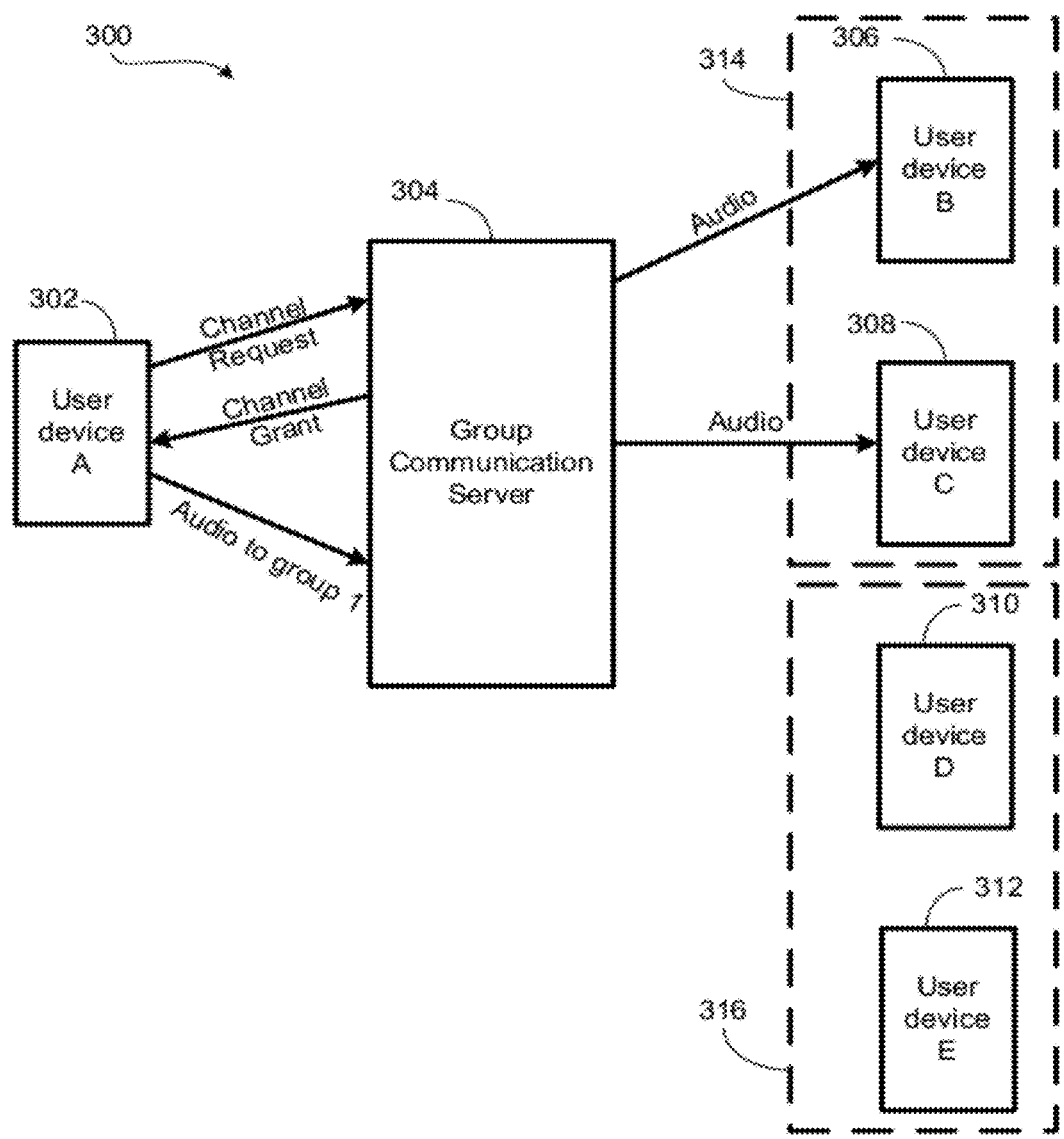
FIG. 3 is a diagram representing interactions between the server and wireless devices during a PTT communication process.

FIG. 3 is a diagram 300 representing interactions between the server (also known as group communication server) 304 and wireless devices 302 during a PTT communication process. A communication does not occur between an initiating wireless device 302 and a server 304 until a user activates a PTT button. The wireless device 302 may be part of one or more PTT communication groups. In the example of FIG. 3, the wireless device 302 belongs to two PTT groups, 314 and 316. The wireless device 302 may monitor both groups and communicate with each group separately and independently. Generally, the user may start a PTT communication with members of a targeted PTT group. The wireless device 302 sends the targeted PTT group information and a PTT communication channel request to the server 304. Upon receiving the PTT communication channel request and the targeted PTT group information, the server 304 checks the availability of the PTT communication channel assigned to the targeted PTT group, and grants the PTT communication channel to the initiating user device 302 if the PTT communication channel is available. After the PTT communication channel is granted to the initiating wireless device 302, the initiating wireless device 302 can transmit audio communication to the targeted PTT group 314 through the server 304. Upon receiving the user audio communication, the server 304 identifies the members 306-308 of the PTT communication group 314 that the initiating user device 302 wants to send the audio communication. The server 304 also broadcasts the audio communication and image code to each member 306-308 of the PTT communication group 314. It should be noted that data other than audio communication can also be sent in a PTT communication, such as video and/or multimedia data. Wireless devices 310-312 that are member of another PTT communication group 316 to which the wireless device 302 is also a member will not receive any audio communication from the wireless device 302 that is directed toward the PTT communication group 314.

Figure 4:
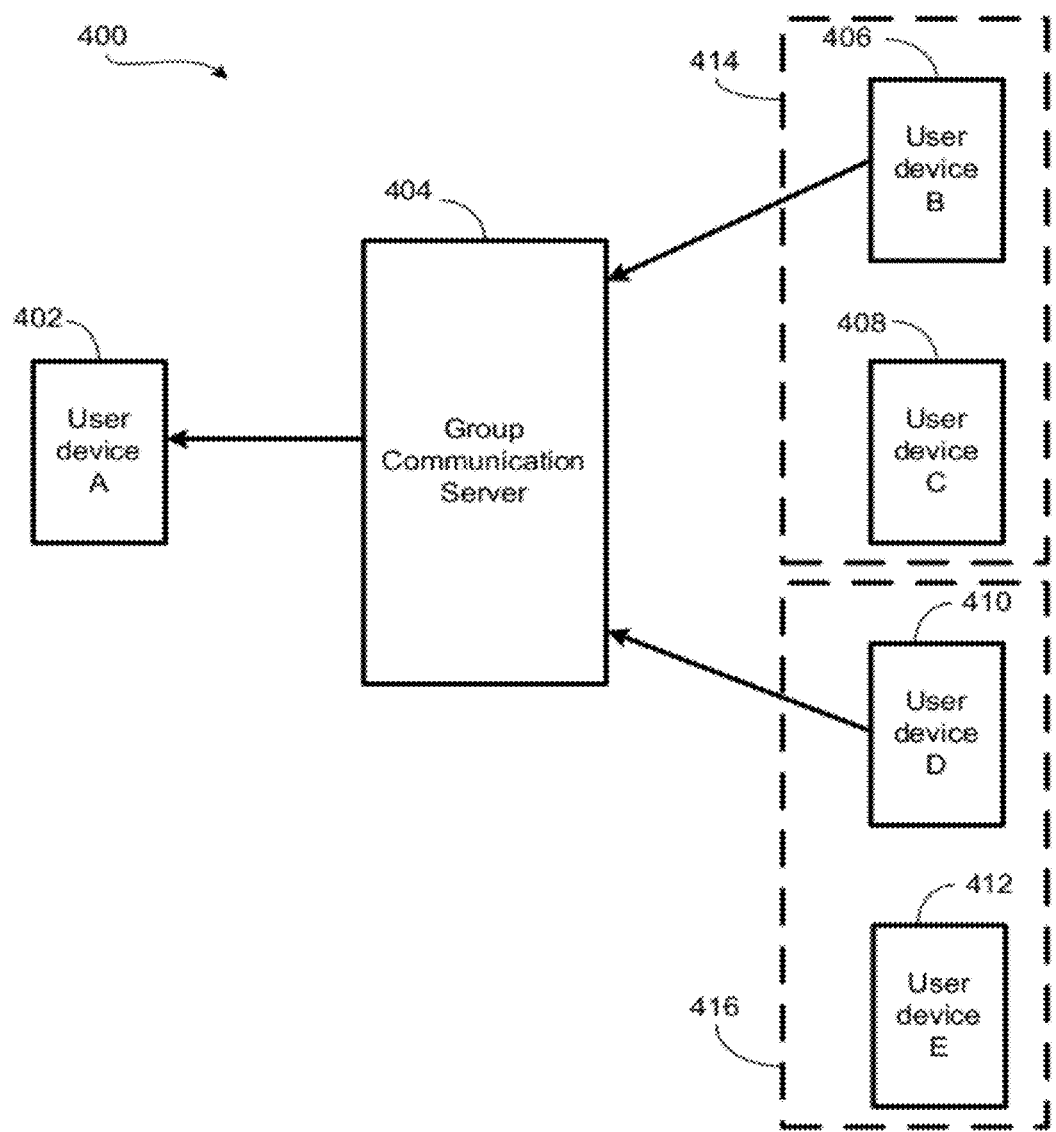
FIG. 4 is a diagram illustrating a wireless device monitoring multiple PTT communication groups.

FIG. 4 is a diagram 400 illustrating a wireless device 402 monitoring multiple PTT communication groups. The wireless device 402 may select to monitor more than one PTT communication groups where one PTT communication group is a primary communication group. When a PTT communication is received from one non-primary PTT group 414 and playing on the wireless device 402, the server 404 may receive a PTT communication from the primary PTT group 416. The server 404 verifies that the PTT communication is from a primary PTT group and that the audio communication currently sent to the wireless device 402 is not a primary PTT audio communication, then the server 404 interrupts the current non-primary PTT audio communication and sends the primary PTT audio communication from the primary PTT group 416 to the wireless device 402. If the server 404 is transmitting a primary PTT communication to the wireless device 402 and another PTT communication, either primary or non-primary, destined for the same wireless device 402 is received, the server 404 does not interrupt the transmission of the primary PTT communication, instead, the server 404 sends the information about the incoming PTT communication to the wireless device 402. The information is sent through a data channel. The information may include the information on about the sender and the PTT communication group. After receiving the information from the server 404, the wireless device 402 can request the primary PTT communication be interrupted and the non-primary PTT communication be transmitted.

The wireless device 402 may also request to temporarily stop monitoring communications from a PTT group. For example, the wireless device 402 may send a request to the server 404 to stop itself from monitoring the communications of the PTT group 416. Upon receipt of the request, the server 404 removes the wireless device 402 from the active participation list of the PTT group 416 and then the wireless device 402 will no longer receive any communication from the PTT group 416. From then on, communications from the PTT group 416 will not be transmitted to the wireless device 402. However, the activity announcements from the server 404 will not be affected by the removal request, the wireless device 402 will continue to receive them. The user may be placed back into the active participation list after a certain time period, if the stop request is associated with a time period. The user may also be placed back into the active participation list with an add request.

The wireless device 402 may also request to completely stop monitoring the communications from the PTT group. In this case, the wireless device 402 is removed from the active participation list of the PTT group. The user at the wireless device 402 may restore the monitoring of the PTT group 416 later on with a selection request.

FIG. 5 is a flow chart for a user selection process 500. A user may subscribe to multiple PTT groups when the first signed for the PTT communication feature, and he may modify his subscription by adding and deleting different PTT groups later on. After the user subscribed to a particular PTT group, his information is added to a master list for that PTT group. The master list lists all the subscribers of the list, who may or may not be monitoring the PTT group on a particular day.

The user can select which of his subscribed PTT groups he wants to monitor on a particular day. The selection process is preferably done every time the wireless device is powered up; however, it may be invoked any time by the user. When the user wants to select PTT groups to monitor, the wireless device sends a selection request to the server, step 502, and receives a list of the subscribed PTT groups from the server, step 504. The subscribed list may be resident on the server or alternatively on several servers. After receiving the list of available PTT groups, the wireless displays it to the user, step 506. The user can then select which PTT groups he wants to monitor. The user's selection is received by the wireless device, step 508. The selection from the user may include the PTT groups that have been set as the primary PTT groups during the user's subscription process. After the user has selected the PTT groups he wants to monitor, the wireless device sends the selection to the server. After selecting the PTT groups the user wants to monitor, the user will then receive all the communications from these selected PTT groups. The activities in the PTT groups that the user has subscribed but not selected for monitoring will not be sent to the wireless device.

In an alternative embodiment, the list of subscribed PTT groups may be resident on the wireless device and there is not need for the wireless device to request and receive the list from the server. Upon powered up, the wireless device displays the list to the user. After the user makes each selection, the wireless device sends a selection request to the server and the server will add the wireless device to the active participation list of the selected PTT group. When the user selects several PTT groups to monitor, the wireless devices sends one selection request per each selected PTT group to the server.

The server maintains an active participation list for each PTT group. When a wireless device is active and the user has selected a PTT group to monitor, the wireless device will be added to the active participation list of that PTT group. When the wireless device is turned off or the user decides to no longer monitor such PTT group, the wireless device is removed from the active participation list. Alternatively, the server may allow a user to be persistent in the active participation list of a PTT group and the user will not be removed from the active participation list each time the wireless device is powered off.

A user may also set one or more primary PTT groups each time he is monitoring a plurality PTT groups. If the user has selected to monitor a plurality of PTT groups and the user may set some of them as the primary PTT groups. He may also rank these PTT groups in a priority order. For example, a user may select to monitor the PTT group with his family members, the PTT group with friends, and the PTT group with his co-workers, and the user may rank the PTT group of his co-workers with the highest priority followed by the PTT group of his family members, then followed by the PTT group of his friends. The user can then monitor all three groups, but the communication from his co-workers will trump communications from his family members and friends. For example, if the user is listening to conversation from a friend in his PTT friend group and a message from his boss is received, the conversation from his friend will be dropped, muted, or placed in the background in favor of the message from his boss.

FIG. 6 is a flow chart for a server selection process 600. The server receives a message with a selection request from a user's wireless device, step 602. The server checks the message, prepares a list of the user's subscribed PTT groups, and sends it to the user, step 604. When the user's selection is received, step 606, the server adds the user to each of the selected PTT groups, step 608.

Figure 7:
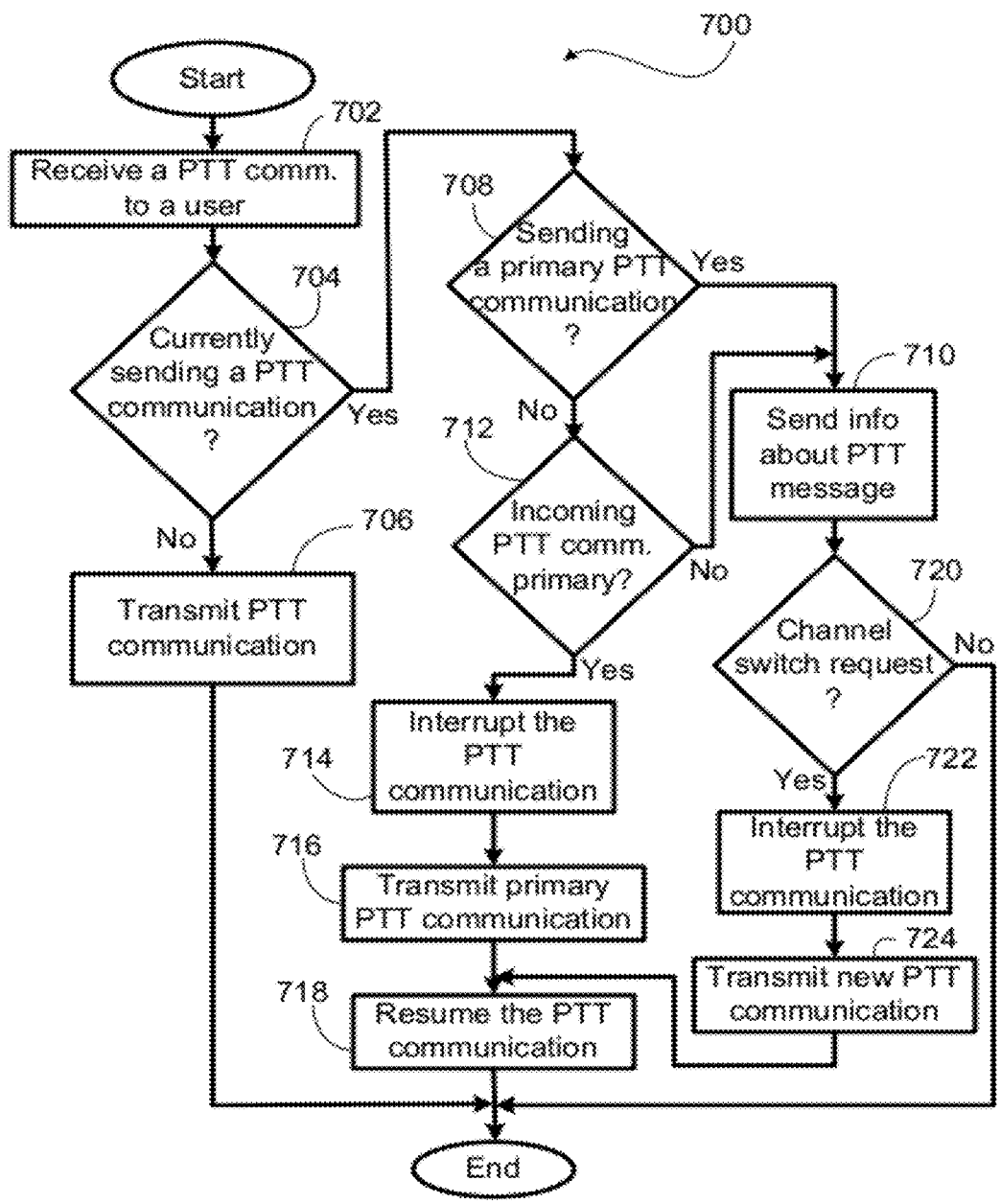
FIG. 7 is a flow chart for an exemplary embodiment of a server message process.

FIG. 7 is a flow chart for a server message process 700. The server receives a message destined to a user, step 702, and checks whether it is sending any PTT communication to the user, step 704. If the user is not receiving any PTT communication, i.e., there is no transmission of any PTT communication to the user, the server transmits the newly received PTT communication to the user, step 706. If the server is sending a PTT communication to the user, the server checks whether it is sending a primary PTT communication, step 708. If the server is already engaged in sending a primary PTT communication to the user, the server will not interrupt the transmission. The server will only send the information about the newly arrived PTT communication, whether primary or not, to the user, step 710. The information may include the identity of the sender, the identity of the PTT group, and other pertinent information.

After receiving the information about the incoming PTT communication, the user may decide whether to switch to the new PTT communication, step 720. If a channel switch is requested, the server then interrupts the current PTT communication to the user, step 722, and transmits the new PTT communication to the user's wireless device, step 724. After transmitting the new PTT communication, the server resumes transmission of the interrupted PTT communication to the user, if it is still going on, step 718.

On the other hand, if the server is not sending a primary PTT communication to the user, the server checks whether the newly arrived PTT communication is a primary PTT communication, step 712. If the arriving PTT communication is non-primary, the server sends its information to the user, step 710 and monitors if any user wants to switch to the new PTT communication as described above. If the arriving PTT communication is a primary communication, the server interrupts the on-going transmission of non-primary PTT communication to the user, step 714, and transmits the primary PTT communication to the user, step 716. After transmitting the primary PTT communication, the server resumes the transmission of the previous non-primary PTT communication to the user, step 718, if the non-primary PTT communication is still active.

Alternatively, if the server is transmitting a non-primary PTT communication to a user and a primary PTT communication directed to the same user is received, the server may lower the volume of the non-primary PTT communication that is being broadcasted to the targeted user and then transmitting the incoming primary PTT communication on the top of the non-primary PTT communication. The user will then hear the primary PTT communication over a fainted non-primary PTT communication.

Figure 8:
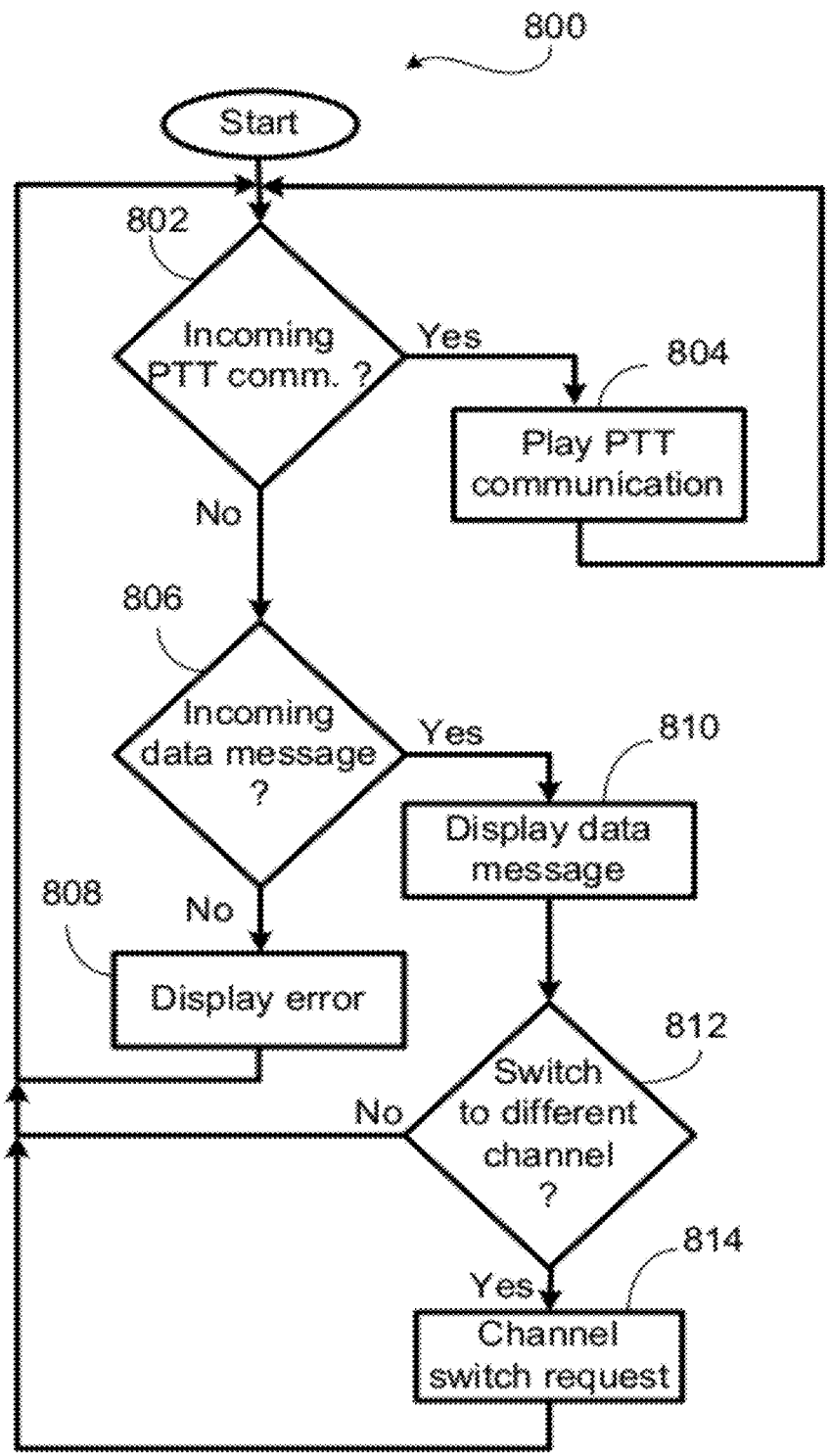
FIG. 8 is a flow chart for an exemplary embodiment of a user message process.

FIG. 8 is a wireless device message process 800. After receiving a message, the wireless device checks whether it is an incoming PTT communication, step 802. If it is an incoming PTT communication, the wireless device sets up the voice channel, receives and plays the PTT communication, step 804. If the message is not a PTT communication, the wireless device checks whether it is a data message regarding a pending PTT communication, step 806. If the message is not a PTT data message, the wireless device displays an error message, step 808. If the message is a PTT data message, the wireless device displays the data message on the display device, step 810, and checks whether the user want to request a channel switch, step 812, and to receive the new PTT communication. If the user opts to monitor the new PTT communication, the wireless device sends a channel switch request to the server, step 814.

The following is a description of one use scenario showing the hierarchical nature of use of the present system. Jane is a caterer who works in the event department of a large hotel. She is the leader of the event service staff and is also responsible for the event room setup. However, she also interacts with the other team leads of the hotel teams (facilities, chefs, cleanup, etc), as well as the hotel management.

To enable team communication, she participates in three PTT communication groups: 1) a PTT group for the service team, 2) a PTT group for all the event leads, and 3) an "emergency" PTT group for the entire hotel staff. One note about the emergency PTT group: the team leads and hotel management are the only people who have "transmit" access for this channel, while all hotel employees have "listen" access.

When Jane goes on duty, she selects these channels (groups), and verifies her priority list (emergency, other calls, leads, service team). Throughout the day the service team channel has the most activity, and she uses it to give direction and answer questions. A few times during the day there is activity on the leads channel to discuss the status for the evening's events and last minute changes. While she is involved in the discussion on the leads channel, she can see on the display device that there is activity on the service team channel (which has a lower priority); she makes a note to ask to the team about it when she is finished.

At one point in the afternoon Jane is in a group call with her family. She can see that there is activity on the team channel, and again makes a note to check on that later. In the middle of her family call, there is a message on the hotel emergency channel, a short message alerting everyone to a minor fire that was just put out in the hotel kitchen. This message briefly interrupts Jane's family call (it plays and cuts off her family talking) and returns her to the family call when the announcement is finished. She quickly signs off from that call, and switches to the leads channel to join a discussion about dealing with the aftermath of the fire and the impact to the evening's events. Jane knows she doesn't have to notify the rest of her staff about the problem; she knows that everyone received the alert as well.

In an alternative embodiment, the invention can easily support a multi-user paging communication system in a wired network. The users may be connected to a wired network as illustrated by computing devices 122 and 124 in FIG. 1. A user at the computing device 122 can communicate with a user at the computing device 124 or at a wireless device 102 in a manner similar as described above.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 5-8, the steps illustrated do not require or imply any particular order of actions. The actions may be executed in sequence or in parallel. The method may also be implemented, for example, by operating portion(s) of the wireless network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. A method for enabling a wireless device having an audio device to monitor multiple group communications on a wireless network, comprising the steps of:
subscribing to multiple communication groups, each group composed of a plurality of wireless devices capable of communicating with all member devices of the group;
selecting a primary communication group;
receiving at least one group communication from a group server and playing the at least one group communication on the audio device, wherein the at least one group communication is from either the primary communication group or a non-primary communication group;
if a group communication from the non-primary communication group is playing on the audio device and a group communication from the primary communication group is received at the wireless device, interrupting the group communication from the non-primary communication group and playing the received group communication from the primary communication group on the audio device of the wireless device; and
if a primary group communication is playing on the audio device and a non-primary group communication is received, displaying information about the non-primary group communication on a display device,
wherein a single, dedicated media channel is maintained between the group server and the wireless device for carrying group media associated with the primary and non-primary communication groups.

2. The method of claim 1, further comprising the step of, if the wireless device is a pre-designated special device in a predefined communication group, transmitting a request to transmit a given group communication.

3. The method of claim 1, further comprising the step of sending a request to transmit a given primary group communication to the primary communication group.

4. The method of claim 2, further comprising the step of, if the wireless device does not have a transmission privilege to transmit the given primary group communication, receiving a denial to transmit the given primary group communication.

5. The method of claim 1, further comprising the step of sending a mute request to the group server, wherein the mute request disables transmission of a given group communication from the group server to the wireless device.

6. The method of claim 1, further comprising the step of receiving an activity announcement for one of the multiple communication groups.

7. The method of claim 6, further comprising the step of displaying the activity announcement on the display device.

8. The method of claim 1, wherein group media associated with only one of the primary and non-primary communication groups is carried on the dedicated media channel at any given time.

9. The method of claim 1,
wherein a control channel, separate from the dedicated media channel, is maintained between the group server and the wireless device,
wherein the non-primary group communication that is received while the primary group communication is playing on the audio device corresponds to control information received over the control channel such that audio playback of group media associated with the primary communication group and received over the dedicated media channel is not interrupted.

10. A method for a group communication server to provide multiple group communications to user devices, comprising the steps of:
receiving a subscription to multiple communication groups, each group composed of a plurality of wireless devices capable of communicating with all member devices of the group;
receiving a selection of a primary communication group;
receiving at least one group communication from a first user device, wherein the at least one group communication is either a primary group communication or a non-primary group communication to a designated group;
if a given non-primary group communication associated with a non-primary communication group is being transmitted to a second user device of the designated group and a first primary group communication is received from the first user device, interrupting the transmission of the given non-primary group communication and transmitting the first primary group communication to the second user device; and if the first primary group communication is being transmitted to the second user device and the given non-primary group communication is received, transmitting information about the given non-primary group communication to the second user device, wherein a single, dedicated media channel is maintained between the group communication server and the second user device for carrying group media associated with the primary and non-primary communication groups.

11. The method of claim 10, further comprising the step of receiving from the second user device a request to transmit a second primary group communication to the primary communication group.

12. The method of claim 11, further comprising the step of, if the second user device does not have a transmission privilege to transmit the second primary group communication, transmitting a message of denial to transmit the second primary group communication to the second user device.

13. The method of claim 10, further comprising the steps of:

receiving a request to transmit a given primary group communication to a predefined communication group from a wireless device; and if the wireless device is a special device in the predefined communication group, transmitting a granting message to the wireless device.

14. The method of claim 10, further comprising the step of receiving a mute request from the second user device, wherein the mute request disables transmission of a given group communication to the second user device.

15. The method of claim 10, further comprising the step of transmitting an activity announcement for a channel to the first user device or the second user device.

16. An apparatus for monitoring multiple group communications on a wireless telecommunication network, comprising:

a transceiver for transmitting and receiving group communications from a remote server;

a storage unit for storing information on multiple communication groups, each group composed of a plurality of wireless devices capable of communicating with all member devices of the group;

a display unit for displaying activity announcements regarding group communications;

a user interface unit for playing group communications received;

a group communication interface for receiving a group communication request from the user; and a controller for determining which group communications to play by the user interface unit wherein the controller is capable of interrupting a group communication that is being played by the user interface unit if playable group communications associated with more than one of the multiple communication groups are received by the transceiver, and wherein the controller is configured to direct the display unit to display information about a non-primary group communication if a primary group communication is playing on an audio device and the non-primary group communication is received, wherein a single, dedicated media channel is maintained between the remote server and the apparatus for carrying group media associated with the multiple communication groups.

17. The apparatus of claim 16, wherein the transceiver is configured to communicate with the remote server through different channels.

18. The apparatus of claim 16, wherein the controller is configured to request a group communication channel from the remote server.

19. The apparatus of claim 16, wherein the controller is configured to request a given primary group communication to a given communication group from the remote server.

20. The apparatus of claim 16, wherein the controller is configured to compare a first priority of the given group communication that is being played by the user interface with a second priority of another group communication.

21. An apparatus for monitoring multiple group communications on a wireless telecommunication network, comprising:

means for transmitting and receiving group communications from a remote server;

means for storing information on multiple communication groups, each group composed of a plurality of wireless devices capable of communicating with all member devices of the group, wherein each communication group is associated with a group communication channel;

means for displaying activity announcements regarding group communications;

means for playing group communications received;

means for receiving a group communication request from a user; and means for determining which group communications to play by the means for playing group communications, wherein the means for determining is capable of interrupting a group communication that is being played by the means for playing group communications if playable group communications associated with more than one of the multiple communication groups are received by the means for transmitting and receiving and wherein the means for determining is configured to direct the means for displaying to display information about a non-primary group communication if a primary group communication is playing on an audio device and the non-primary group communication is received, wherein a single, dedicated media channel is maintained between the remote server and the apparatus for carrying group media associated with the multiple communication groups.

22. A non-transitory computer-readable medium on which is stored a computer program for enabling a user device having an audio device and display device to monitor multiple group communications on a wireless network, the computer program comprising computer instructions that when executed by a computer performs the steps of:

subscribing to multiple communication groups, each group composed of a plurality of wireless devices capable of communicating with all member devices of the group;

selecting a primary communication group;

receiving at least one group communication from a group server and playing the at least one group communication on the audio device, wherein the at least one group communication is from either the primary communication group or a non-primary communication group;

if a given non-primary group communication from the non-primary communication group is playing on the audio device and a first primary group communication from the primary communication group is received at a wireless device, interrupting the given non-primary group communication from the non-primary communication group and playing the first primary group communication from the primary communication group on the audio device of the wireless device; and if the first primary group communication is playing on the audio device and a non-primary group communication is received, displaying information about the non-primary group communication on the display device, wherein a single, dedicated media channel is maintained between the group server and the wireless device for carrying group media associated with the primary and non-primary communication groups.

23. The non-transitory computer-readable medium of claim 22, wherein the computer program further performs the step of, if the first primary group communication is playing on the audio device and the given non-primary group communication is received, displaying information about the non-primary group communication on the display device.

24. The non-transitory computer-readable medium of claim 22, wherein the computer program further performs the step of, if the wireless device is a pre-designated special device in a predefined communication group, transmitting a request to transmit a given group communication.

25. The non-transitory computer-readable medium of claim 22, wherein the computer program further performs the step of sending a request to transmit a second primary group communication to the primary communication group.

26. The non-transitory computer-readable medium of claim 25, wherein the computer program further performs the step of, if the user device does not have a transmission privilege to transmit the second primary group communication, receiving a denial to transmit the second primary group communication.

27. The non-transitory computer-readable medium of claim 22, wherein the computer program further performs the step of sending a mute request to the group server, wherein the mute request disables transmission of a given group communication from the group server to the user device.

28. The non-transitory computer-readable medium of claim 22, wherein the computer program further performs the step of receiving an activity announcement for a channel.

29. The non-transitory computer-readable medium of claim 28, wherein the computer program further performs the step of displaying the activity announcement on the display device.

30. A non-transitory computer-readable medium on which is stored a computer program for a group communication server to provide multiple group communications to user devices, the computer program comprising computer instructions that when executed by a computer performs the steps of:
    receiving a subscription to multiple communication groups, each group composed of a plurality of wireless devices capable of communicating with all member devices of the group;
    receiving a selection of a primary communication group;
    receiving at least one group communication from a first user device, wherein the at least one group communication is either a primary group communication or a non-primary group communication to a designated group;
    if a given non-primary group communication associated with a non-primary communication group is being transmitted to a second user device of the designated group and a first primary group communication is received from the first user device, interrupting the transmission of the given non-primary group communication and transmitting the first primary group communication to the second user device; and
    if the first primary group communication is being transmitted to the second user device and the given non-primary group communication is received, transmitting information about the given non-primary group communication to the second user device,
    wherein a single, dedicated media channel is maintained between the group communication server and the second user device for carrying group media associated with the primary and non-primary communication groups.

31. The non-transitory computer-readable medium of claim 30, further performing the step of receiving from the second user device a request to transmit a second primary group communication to the primary communication group.

32. The non-transitory computer-readable medium of claim 31, further performing the step of, if the second user device does not have a transmission privilege to transmit the second primary group communication, transmitting a message of denial to transmit the second primary group communication to the second user device.

33. The non-transitory computer-readable medium of claim 30, further performing the steps of:
    receiving a request to transmit a given primary group communication to a predefined communication group from a wireless device; and
    if the wireless device is a special device in the predefined communication group, transmitting a granting message to the wireless device.

34. The non-transitory computer-readable medium of claim 30, further performing the step of receiving a mute request from the second user device, wherein the mute request disables transmission of a given group communication to the second user device.

35. The non-transitory computer-readable medium of claim 30, further performing the step of transmitting an activity announcement for a channel to the first user device or the second user device.

36. A method for enabling a wireless device having an audio device and a display device to monitor multiple group communications on a wireless network, comprising:
    a step for subscribing to multiple communication groups, each group composed of a plurality of wireless devices capable of communicating with all member devices of the group;
    a step for selecting a primary communication group;
    a step for receiving at least one group communication from a group server and playing the at least one group communication on the audio device, wherein the at least one group communication is from either the primary communication group or a non-primary communication group;
    if a group communication from the non-primary communication group is playing on the audio device and a group communication from the primary communication group is received at the wireless device, a step for interrupting the group communication from the non-primary communication group and playing the received group communication from the primary communication group on the audio device of the wireless device; and
    if a primary group communication is playing on the audio device and a non-primary group communication is received, displaying information about the non-primary group communication on the display device,
    wherein a single, dedicated media channel is maintained between the group server and the wireless device for carrying group media associated with the primary and non-primary communication groups.

37. A method for a group communication server to provide multiple group communications to user devices, comprising:
- a step for receiving a subscription to multiple communication groups, each group composed of a plurality of wireless devices capable of communicating with all member devices of the group;
- a step for receiving a selection of a primary communication group;
- a step for receiving at least one group communication from a first user device, wherein the at least one group communication is either a primary group communication or a non-primary group communication to a designated group;
- if a given non-primary group communication associated with a non-primary communication group is being transmitted to a second user device of the designated group and a first primary group communication is received from the first user device, interrupting the transmission of the given non-primary group communication and transmitting the first primary group communication to the second user device; and
- if the first primary group communication is being transmitted to the second user device and the given non-primary group communication is received, transmitting information about the given non-primary group communication to the second user device,
- wherein a single, dedicated media channel is maintained between the group communication server and the second user device for carrying group media associated with the primary and non-primary communication groups.

38. A method of monitoring multiple group communications at a wireless device having an audio device on a wireless network, comprising:
- subscribing to multiple communication groups, each group composed of a plurality of wireless devices capable of communicating with all member devices of the group;
- establishing, for a group communication session with a first of the multiple communication groups, a dedicated media channel with a group server, the dedicated media channel configured to carry group media associated with a single communication group at a time;
- establishing a separate control channel with the group server, the separate control channel configured to receive control information associated with one or more of the multiple communication groups; and
- receiving given group media from at least one of the multiple communication groups over the dedicated media channel.

39. The method of claim 38, further comprising:
- receiving information associated with a second of the multiple communication groups on the separate control channel; and
- displaying the information on the wireless device,
- wherein the receiving given group media step continues to receive the given group media over the dedicated media channel that is associated with the first communication group during the displaying step.

40. The method of claim 39, wherein the received information is sent on the separate control channel instead of the receiving given group media media step transitioning to the second communication group based on a recognition, at the group server, that the first communication group has a higher priority than the second communication group for the wireless device.

41. The method of claim 38, wherein the receiving step transitions from (i) receiving the given group media over the dedicated media channel that is associated with the first communication group to (ii) receiving the given group media over the dedicated media channel that is associated with a second communication group, such that audio playback of the given group media for the first communication group is interrupted.

42. The method of claim 41, wherein the transition of given group media from the first communication group to the second communication group is implemented at the group server based on the second communication group having a higher priority than the first communication group for the wireless device.

43. A method of supporting multiple group communications at a group server for a wireless device having an audio device on a wireless network, comprising:
- establishing, for a group communication session with a first of multiple communication groups, a dedicated media channel with the wireless device, the dedicated media channel configured to carry group media associated with a single communication group at a time;
- establishing a separate control channel with the wireless device, the separate control channel configured to transmit control information associated with one or more of the multiple groups to the wireless device; and
- transmitting given group media for at least one of the multiple communication groups to the wireless device over the dedicated media channel.

44. The method of claim 43, further comprising:
- transmitting information associated with a second of the multiple communication groups to the wireless device on the separate control channel;
- wherein the transmitting given group media step continues to transmit the given group media over the dedicated media channel that is associated with the first communication group while the transmitting information step is performed.

45. The method of claim 44, wherein the transmitting information step is performed instead of the transmitting given group media step transitioning to the second communication group based on a recognition, at the group server, that the first communication group has a higher priority than the second communication group for the wireless device.

46. The method of claim 43, wherein the transmitting step transitions from (i) transmitting the given group media over the dedicated media channel that is associated with the first communication group to (ii) transmitting the given group media over the dedicated media channel that is associated with a second communication group.

47. The method of claim 46, wherein the transition of the given group media from the first communication group to the second communication group is implemented at the group server based on the second communication group having a higher priority than the first communication group for the wireless device.

48. The method of claim 43, further comprising:
- receiving group media associated with a second of the multiple communication groups while the transmitting step is transmitting the given group media associated with the first communication group;
- determining that the second communication group has a higher priority than the first communication group;
- mixing the given group media associated with the first communication and the received group media associated with the second communications group such that the mixed group media is configured to be played by the wireless device with the received group media associated with the second communication group having a higher volume than the given group media associated with the first communication group;

continuing the transmitting step by transmitting the mixed group media to the wireless device over the dedicated media channel.

49. A group communication server configured to provide multiple group communications to user devices, comprising:
- a receiver configured to:
    - receive a subscription to multiple communication groups, each group composed of a plurality of wireless devices capable of communicating with all member devices of the group;
    - receive a selection of a primary communication group;
    - receive at least one group communication from a first user device, wherein the at least one group communication is either a primary group communication or a non-primary group communication to a designated group;
    - if a given non-primary group communication associated with a non-primary communication group is being transmitted to a second user device of the designated group and a first primary group communication is received from the first user device, interrupt the transmission of the given non-primary group communication and transmit the first primary group communication to the second user device; and
    - if the first primary group communication is being transmitted to the second user device and the given non-primary group communication is received, transmit information about the given non-primary group communication to the second user device,
- wherein a single, dedicated media channel is maintained between the group communication server and the second user device for carrying group media associated with the primary and non-primary communication groups.

50. A group communication server configured to provide multiple group communications to user devices, comprising:
- means for receiving a subscription to multiple communication groups, each group composed of a plurality of wireless devices capable of communicating with all member devices of the group;
- means for receiving a selection of a primary communication group;
- means for receiving at least one group communication from a first user device, wherein the at least one group communication is either a primary group communication or a non-primary group communication to a designated group;
- means for interrupting the transmission of a given non-primary group communication and transmitting a given primary group communication to the second user device if the given non-primary group communication associated with a non-primary communication group is being transmitted to the second user device of the designated group and the given primary group communication is received from the first user device; and
- means for transmitting information about the given non-primary group communication to the second user device if the given primary group communication is being transmitted to the second user device and the given non-primary group communication is received,
- wherein a single, dedicated media channel is maintained between the group communication server and the second user device for carrying group media associated with the primary and non-primary communication groups.

* * * * *